United States Patent [19]

Hensley et al.

[11] Patent Number: 4,878,678
[45] Date of Patent: Nov. 7, 1989

[54] HIGH TEMPERATURE METALLIC GASKET

[75] Inventors: John J. Hensley; Christian M. Waldhelm, both of San Diego; Henry J. Tohill, Chula Vista; Kenneth G. Kubarych, Del Mar, all of Calif.

[73] Assignee: Solar Turbines Incorporated, San Diego, Calif.

[21] Appl. No.: 71,438

[22] Filed: Jul. 9, 1987

[51] Int. Cl.⁴ .............................................. F16J 15/08
[52] U.S. Cl. ............................. 277/235 A; 277/234; 277/236
[58] Field of Search .............. 277/234, 235 R, 235 A, 277/235 B, 236

[56] References Cited

U.S. PATENT DOCUMENTS

| | | | |
|---|---|---|---|
| 1,478,108 | 12/1923 | Dieter | 277/235 A |
| 2,289,620 | 7/1942 | Bernstein | 277/234 |
| 3,188,100 | 6/1965 | Delgado | 277/235 A X |
| 3,747,963 | 7/1973 | Shivak | 277/236 X |
| 3,909,019 | 9/1975 | Leko | 277/235 A X |

FOREIGN PATENT DOCUMENTS

| | | | |
|---|---|---|---|
| 215538 | 6/1958 | Australia | 277/234 |
| 969210 | 6/1975 | Canada | 277/236 |
| 55-139555 | 10/1980 | Japan | 277/236 |
| 450274 | 7/1936 | United Kingdom | 277/236 |
| 712786 | 7/1954 | United Kingdom | 277/236 |
| 914937 | 1/1963 | United Kingdom | 277/235 R |
| 1212767 | 11/1970 | United Kingdom | 277/235 R |

Primary Examiner—Robert S. Ward
Attorney, Agent, or Firm—Larry G. Cain

[57] ABSTRACT

A metallic gasket for sealing a joint between first and second surfaces subjected to high pressure and high temperature. Other gaskets used to seal such joints are of a fibrous composition held together by a suitable bonding agent and a deformable elastomer coat or bead. Many of these gaskets used for high pressure and high temperature use an asbestos sheet which is regarded as toxic and unsafe to handle. The present gasket is comprised of a substantially non-compressible sheet and pair of seals made from a ductile material connected to opposite sides of the sheet. The sheet and seals are positioned between the surfaces to be sealed and the seals conform to the surface finish topography of the surfaces when a predetermined compressive load is applied between the surfaces resulting in a positive sealed joint suitable for high pressure and high temperature.

15 Claims, 2 Drawing Sheets

HIGH TEMPERATURE METALLIC GASKET

DESCRIPTION

TECHNICAL FIELD

This invention relates generally to gaskets and more particularly to high temperature metallic gaskets.

BACKGROUND ART

In general, gaskets comprise a base sheet of uniform thickness which may be of metal or of a fibrous composition held together by a suitable bonding agent, and a deformable elastomer coat or bead which may cover all or only selected areas of the sheet. In use, the coat or bead deforms or spreads under pressure of forcing together the components between which the gasket material lies and provides a fluid tight seal between the parts.

At present, gaskets designed to function at high temperatures are manufactured from two or three ply laminates consisting of one or two metal sheets and one or three asbestos sheets. However, these laminates are expensive to manufacture and require excessive labor and material. Also the use of asbestos has become increasingly regarded as toxic and unsafe to handle.

U.S. Pat. No. 4,544,169 issued to David A. Cobb, et al. on Oct. 1, 1985 discloses a high temperature resistant gasket assembly including a first metallic sheet, a second metallic sheet and a wire located therebetween to surround the shape of the opening to be sealed. The wire can also be partially embedded into one of the sheets.

U.S. Pat. No. 2,289,620 issued to Wilburn F. Bernstein on July 14, 1942 discloses a cylinder head gasket comprised of a sheet of metal blanked to conform to a combustion opening, metal particles deposited on and intimately joined to the face of said gasket about the combustion openings to provide a porous roughened surface and a coating of a heat convertible synthetic resin covering and anchored to the porous surface of the metal particles to seal the space between the cylinder head and block.

The U.S. Pat. No. 3,193,920 issued to Robert D. Culberson, et al. on July 21, 1965 discloses hard metal pressure seals for electron tubes wherein the hard metal sealing rings are plated with a soft ductile metal. A soft metal gasket is placed between the two soft metal clad surfaces on each of the hard metal rings. Force is applied to the hard metal rings until the gasket yields and deforms. The gasket then adhears to the plated surfaces making a permanent sealed unit.

Normally, high temperature applications make severe demands on gaskets. Many gasket materials are simply unable to meet such demands, and those which are tentatively able to do so have quite brief useful lives.

These problems as mentioned above complicate the structures, increase cost and use toxic materials which are unsafe to handle.

The present invention is directed to overcoming one or more of the problems as set forth above.

DISCLOSURE OF THE INVENTION

In one aspect of the present invention a metallic gasket is disclosed having a substantially non-compressible metallic sheet having at least one opening therethrough and opposite sides. The gasket further includes at least a pair of seals each being connected to a portion of the sheet circumferentially around the opening on each side of the sheet. The seals are formed of a metallic material having sufficient ductility to sealingly conform to a surface to be sealed when a predetermined compressive load is applied thereto.

In another aspect of the present invention a metallic gasket is disclosed for sealing a joint having first and second surfaces and including means for applying a predetermined compressive load between the surfaces. The gasket comprises a substantially non-compressible sheet having at least one opening therethrough and opposite sides. The sheet is located between the surfaces. The gasket further comprises at least a pair of seals each being connected to a portion of the sheet circumferentially around the opening on each side of the sheet and being positioned between the sheet and one of the surfaces. The seals are formed of a metallic material having sufficient ductility to sealingly conform to the surfaces when the predetermined compressive load is applied between the surfaces.

BEST MODE OF CARRYING OUT THE INVENTION

Figure 1:
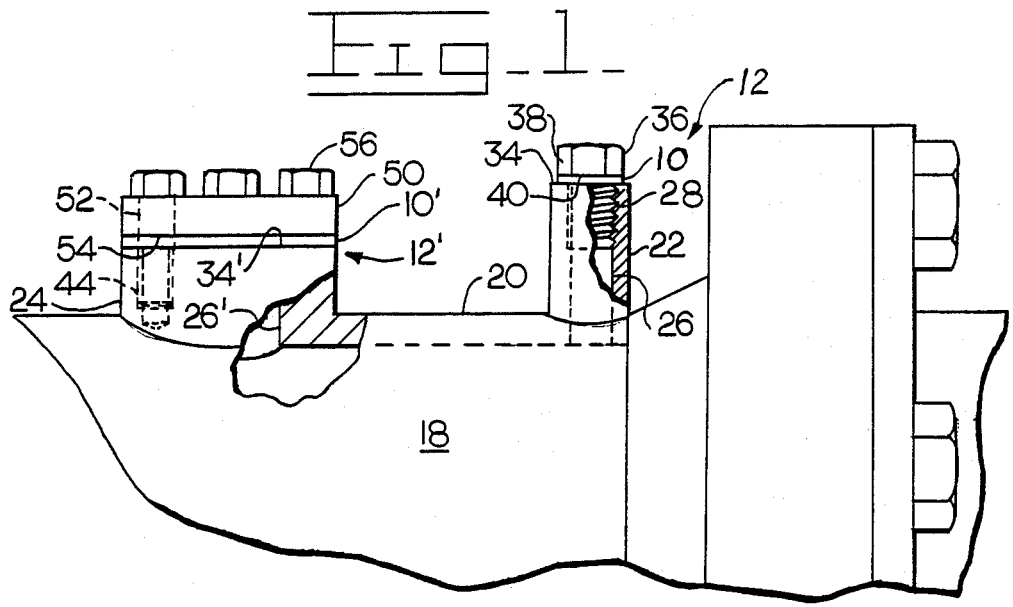
FIG. 1 is a view of a portion of a gas turbine engine showing to embodiments of the present invention.

Referring to the drawings, and more specifically to FIG. 1, two separate embodiments of metallic gaskets 10,10' are shown for sealing two types of joints 12,12' of a gas turbine engine 18.

The engine 18 includes an outer case 20 having a plurality of bosses, two of which are shown at 22 and 24, attached thereto. The boss 22 has a through bore 26 and a threaded portion 28 of the bore 26. Each of the bosses 22,24 has a relative flat first sealing surface 34,34' which has a surface finish ranging between 2 mu and 500 mu. A cap 36 is threadably attached to the threaded portion 28 and has a hex head 38 and a relatively flat second sealing surface 40 which has a surface finish ranging between 2 mu and 500 mu.

The boss 24 has a through bore 26' and a plurality of threaded bores 44 circumferentially positioned about the bore 26'. A cover 50 has a plurality of through bores 52 therein which geometrically coincide with the plurality of threaded bores 44 in the boss 24. The cover 50 further has a relatively flat second sealing surface 54 which has a surface finish ranging between 2 mu and 500 mu. The cover 50 is attached to the boss 24 by a plurality of fasteners 56.

Figure 2:
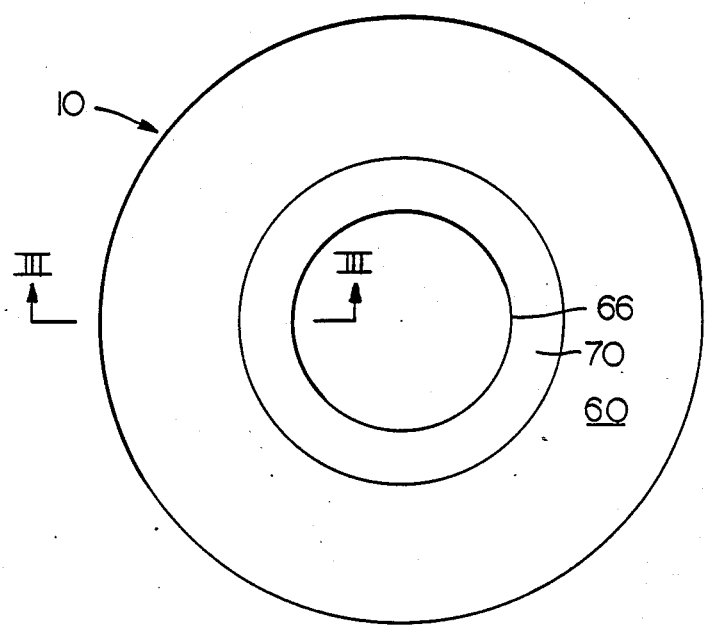
FIG. 2 is a top view of one embodiment of the present invention.
Figure 3:
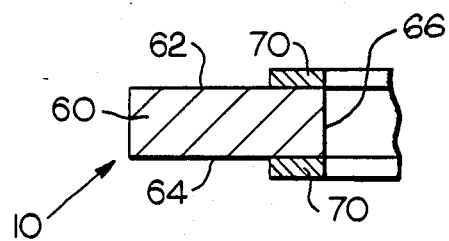
FIG. 3 is an enlarged sectional view taken along line III—III of FIG. 2.

One embodiment of the metallic gasket 10 is sealingly disposed at the joint 12 between the surfaces 34 and 40. As best shown in FIG. 2 and FIG. 3, the metallic gasket 10 includes a base sheet 60 having opposite sides 62,64, and an opening 66 therethrough and a pair of metallic seals 70. The base sheet 60 is substantially non-compressible and is made of materials such as 300 series stainless or a nickel chromium based alloy such as "Inconel" which is a registered trade name of International Nickel Co. Inc. The sheet 60 resists deformation under pressure loading of between 20,670 kPa to 27,560 kPa at elevated temperatures ranging from 300° C. to 815° C. The metallic seals 70 are each connected to a portion of the respective sides 62,64, of the sheet 60 circumferentially around the opening 66 which in this example is round but could be eliptical or of any configuration and are made of a soft ductile metallic sealing material such as silver, nickel or copper based alloys. Pure silver, nickel and copper can also be used as the metallic seals 70. The metallic sealing material has a hardness range of from 40 to 60 Rockwell B and deforms under pressure loading of between 20,670 kPa to 27,560 kPa. The metallic sealing material has a melting temperature higher than the elevated temperature.

It has been found through experimentation that the best combination of thickness and width of the metallic seal 70 ranges from 0.10 mm to 0.30 mm and from 1 mm to 3 mm respectively. The metallic seal 70 can be connected to the base sheet 60 by a wide variety of manufacturing processes such as spray coating or plating in which the metallic seals are built up in layers to provide the predetermined width and thickness. The metallic seals 70 may also be formed in a washer like configuration and adhesively connected to the base sheet 60.

Figure 4:
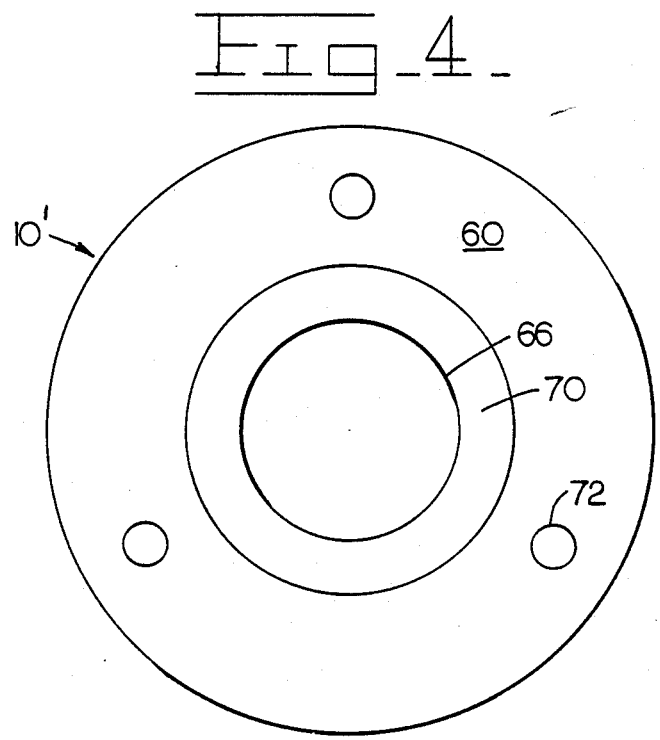
FIG. 4 is a top view of another embodiment of the present invention.

The second embodiment of the metallic gasket 10' is best shown in FIG. 4 sealingly disposed at the joint 12' between surfaces 34' and 54. The second embodiment is substantially identical to the metallic gasket 10 in both construction and function. In this embodiment the base sheet 60 further includes a plurality of through bores 72. These bores 72 are positioned to geometrically correspond to the plurality of threaded bores 44 in the boss 24.

The engine 18 in this particular application although shown as a gas turbine engine could also be any conventional internal combustion engine or any device requiring a high temperature seal.

Industrial Applicability

The metallic gasket 10 is used to seal the joint 12 between the cap 36 and the boss 22. The metallic gasket 10 is positioned on the flat surface 34 of the boss 22 and surrounds the bore 26. A portion of the cap 36 is inserted through the opening 66 in the gasket 10 and threaded into the threaded portion 28 of boss 22. The sealing surface 40 on the cap 36 and the flat sealing surface 34 on boss 22 engage with the metallic seals 70 on respective sides of the gasket 10 as the cap 36 is tightened in the boss 22. The cap 36 is tightened sufficiently to generate a predetermined compressive load between the surfaces 40,34. The compressive load crushes the seals 70 causing the ductile metallic material to conform to the flat surface 40 and the sealing surface 34 finish topography on the cap 36 and boss 22 forming a positive fluid tight seal.

The metallic gasket 10' is used to seal the joint 12' between the cover 50 and the boss 24. The metallic gasket 10' is positioned on the flat surface 34' of the boss 24 and surrounds the bore 26' in the boss 24. The bores 72 in the base sheet 60 are positioned to align with the threaded bores 44 in the boss 24. The cover 50 is positioned to align the bores 52 with the respective bores 72 and threaded bores 44 in the base sheet 60 and boss 24. The fasteners 56 are inserted through the bores 52,72 and are threaded into the threaded bores 44. The fasteners 56 are tightened sufficiently to generate a predetermined compressive load between the surfaces 54,34'. The compressive load causes the ductile material to conform to the finish topography of the respective surfaces 54,34'.

The metallic gasket 10,10' discussed above provides an economical, reusable, asbestos free sealing gasket for use in high pressure high temperature applications. The substantially non-compressible metallic sheet 60 provides a stable supporting base which retains its shape under high pressure and temperature while the ductile material of the seals crushes to conform to the finish topography of the respective surfaces 40,34 and 54,34'. The thickness of the base sheet 60 can be varied to compensate for tolerance stack-ups and other variation in manufacturing and assembly procedures without affecting the sealing effect of the metallic seals' 70 ability to crush and conform to the surface finish topography of the components being sealed. Thus, the metallic gasket 10,10' overcomes the use of toxic materials, complicated structures and limited life of prior art high temperature high pressure gaskets.

Other aspects, objects and advantages of this invention can be obtained from a study of the drawings, the disclosure and the appended claims.

We claim:

1. A metallic gasket comprising:
   a substantially non-compressible metallic sheet having at least one opening therethrough and opposite sides;
   at least a pair of seals each being connected to a portion of the sheet circumferentially around the opening on each side of the sheet, said seals being formed of a metallic material having sufficient ductility to sealingly conform to a surface to be sealed when a predetermined compressive load is applied thereto, said pair of seals having a thickness which falls within the range of from 0.10 mm to 0.30 mm a width which falls within the range of from 1 mm to 3 mm.

2. The metallic gasket of claim 1 wherein said metallic sheet resists deformation under pressure loading at elevated temperatures.

3. The metallic gasket of claim 2 wherein said elevated temperatures fall within a range of from about 300° C. to about 815° C.

4. The metallic gasket of claim 3 wherein said sheet is made from stainless steel.

5. The metallic gasket of claim 3 wherein said sheet is made from a nickel chromium based alloy.

6. The metallic gasket of claim 3 wherein said metallic material has a melting temperature higher than said elevated temperature.

7. The metallic gasket of claim 6 wherein said metallic material has a hardness within the range of from 40 to about 60 Rockwell B.

8. A metallic gasket comprising:
   a substantially non-compressible metallic sheet having at least one opening therethrough and opposite sides;
   at least a pair of seals selected from the group consisting of silver, nickel and copper material each being connected to a portion f the sheet circumferentially around the opening on each side of the sheet, said seals being formed of a metallic material having sufficient ductility to sealingly conform to a surface to be sealed when a predetermined compressive load is applied thereto, said pair of seals having a thickness which falls within the range of from 0.10 mm to 0.30 mm and a width which falls within the range of from 1 mm to 3 mm.

9. A metallic gasket comprising:

a substantially non-compressible metallic sheet having at least one opening therethrough and opposite sides;

at least a pair of seals selected from the group consisting of silver, nickel and copper based alloy each being connected to a portion of the sheet circumferentially around the opening on each side of the sheet, said seals being formed of a metallic material having sufficient ductility to sealingly conform to a surface to be sealed when a predetermined compressive load is applied thereto, said pair of seals having a thickness which falls within the range of from 0.10 mm to 0.30 mm and a width which falls within the range of from 1 mm to 3 mm.

10. The metallic gasket of claim 1 wherein said metallic material is connected to the metallic sheet by a spraying process.

11. The metallic gasket of claim 1 wherein said metallic material is connected to the metallic sheet by a plating process.

12. The metallic gasket of claim 1 wherein said seals are formed washers adhesively connected to the metallic sheet.

13. A metallic gasket for sealing a joint having first and second surfaces to be sealed and including means for applying a predetermined compressive load between the surfaces, said gasket comprising:

a substantially non-compressible sheet having at least one opening therethrough and opposite sides, said sheet being located between the surfaces;

at least a pair of seals each being connected to a portion of the sheet circumferentially around the opening on each side of the sheet and being positioned between the sheet and one of the surfaces, said seals being formed of a metallic material having sufficient ductility to sealingly conform to the surfaces when the predetermined compressive load is applied between the surfaces, said pair of seals having a thickness which falls within the range of from 0.10 mm to 0.30 mm and a width which falls within the range of from 1 mm to 3 mm.

14. The metallic seal of claim 13 wherein said first and second surfaces have a surface finish between the range of 2 mu to 500 mu.

15. The metallic gasket of claim 14 wherein said compressive load causes the seals to conform to the surface finish topography of the first and second surfaces.

* * * * *